United States Patent [19]

Credelle et al.

[11] 4,137,077
[45] Jan. 30, 1979

[54] BROADENING THE SPATIAL FREQUENCY PASS BAND OF A THERMOPLASTIC LAYER

[75] Inventors: Thomas L. Credelle, East Windsor, N.J.; William J. Hannan, Palm Beach Gardens, Fla.; Fred W. Spong, Lawrenceville, N.J.

[73] Assignee: RCA Corporation, New York, N.Y.

[21] Appl. No.: 653,288

[22] Filed: Jan. 29, 1976

[51] Int. Cl.² ............................................. G03G 16/00
[52] U.S. Cl. ........................................ 96/1.1; 96/27 H; 346/77 E; 358/2; 428/172; 428/913
[58] Field of Search ........................ 96/1.1, 27 H, 35.1; 428/913, 141, 172; 340/173 TP; 346/151, 77 E; 350/3.5; 358/2, 3, 90, 124

[56] References Cited

U.S. PATENT DOCUMENTS

| | | | |
|---|---|---|---|
| 3,406,405 | 10/1968 | Somers | 340/173 TP |
| 3,560,206 | 2/1971 | Uvirblis | 96/1.1 |
| 3,669,673 | 6/1972 | Ih et al. | 96/27 H |
| 3,698,893 | 10/1972 | Heurtley | 96/1.1 |
| 3,764,311 | 10/1973 | Bean | 96/1.1 |

FOREIGN PATENT DOCUMENTS 637335 12/1963 Belgium.

*Primary Examiner*—Stanley S. Silverman
*Attorney, Agent, or Firm*—Edward J. Norton; H. Christoffersen; Joseph D. Lazar

[57] ABSTRACT

A layer of thermally deformable plastic used, for example, in a holographic recording medium has an undulated surface whereby the layer has an uneven thickness. Because of the uneven thickness, the layer has a composite spatial frequency pass band greater than the spatial frequency pass band of a layer of uniform thickness.

8 Claims, 3 Drawing Figures

BROADENING THE SPATIAL FREQUENCY PASS BAND OF A THERMOPLASTIC LAYER

BACKGROUND OF THE INVENTION

1. Field of Invention

This invention relates to holography and more particularly to a holographic recording medium comprised of a thermally deformable plastic.

2. Description of the Prior Art

In a typical hologram of an image, each portion of the image is recorded at a multiplicity of locations on a recording medium. Therefore, the hologram is inherently a highly redundant recording. Because of the inherent redundancy, when, for example, portions of the hologram are disfigured or discarded, an undiscarded, clean portion can provide a holographic reconstruction of the entire image. The inherent redundancy is a desirable feature of the hologram which is practically unknown in other types of recording.

The image may be holographically recorded on a medium, such as a tape, which typically includes a layer of a photoconductor intermediate to a layer of an electrically conductive material and a layer of thermoplastic. Accordingly, the thermoplastic has a surface abutting the photoconductor and a free surface.

The thermoplastic is comprised of a dielectric which becomes soft in response to an application of heat. Materials such as thermoplastic are known in the art as thermally deformable plastics.

To holographically record an image on the medium, a uniform voltage is maintained between the conductive layer and the free surface. In response to the photoconductor being provided with an interference pattern of light representative of the image, an electrical charge on the thermoplastic varies spatially in a pattern of a diffraction grating (comprising the hologram of the image).

The pattern of the charge establishes a corresponding pattern of electrostatic force between opposed surfaces of the thermoplastic. In response to an application of heat, the free surface is softened whereby the diffraction grating is formed therein by the electrostatic force.

When the diffraction grating is used to provide a holographic reconstruction of the image, portions of the image are usually inaccurately reconstructed. The inaccurate reconstruction is cause by a correspondence of portions of the image to spatial frequencies which are not within a spatial frequency pass band of the thermoplastic whereby the portions are not efficiently recorded. Typically, the pass band is approximately equal to 400 cycles per millimeter. Additionally, the pass band has a center frequency known in the art as a frost frequency. It is well-known that the frost frequency is inversely proportional to the thickness of the thermoplastic.

Usually, the 400 cycles per millimeter pass band is on the order of a range of spatial frequencies comprising the hologram of the image (referred to as the image range hereinafter). Therefore, it is desirable to have the frost frequency substantially equal to the center frequency of the image range. Since the frost frequency is inversely proportional to the thickness of the thermoplastic, the thickness is of critical importance when the thermoplastic is fabricated; a slight error in the fabrication which causes an error in the thickness results in the frost frequency deviating from the center of the image range thereby causing an inefficient recording. The critical importance of the thickness causes the recording medium to be expensive and unreliable. Heretofore, the inherent redundancy of a hologram has not been used to broaden the spatial frequency pass band of a layer of thermoplastic.

SUMMARY OF THE INVENTION

According to the present invention, in a holographic recording medium, a layer of thermally deformable plastic has an uneven thickness whereby the layer has a composite pass band greater than the pass band of a layer of a thermally deformable plastic having a uniform thickness.

DESCRIPTION OF THE PREFERRED EMBODIMENT

In the preferred embodiment, a thermoplastic layer has an uneven thickness thereby causing the thermoplastic to have a multiplicity of pass bands. The uneven thickness is an essential feature of the present invention.

The multiplicity of pass bands form a composite pass band whereby an image, holographically recorded on the thermoplastic, is accurately reconstructed when the hologram of the image is comprsied of spatial frequencies within the composite pass band.

Figure 1:
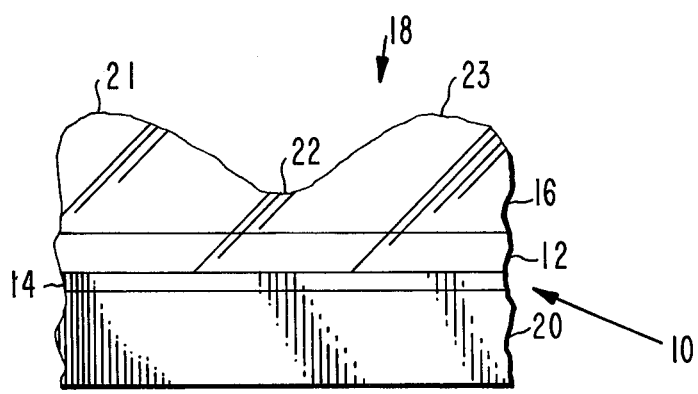
FIG. 1 is a side elevation of a segment of tape in accordance with a preferred embodiment of the present invention.

Referring to FIG. 1, in the preferred embodiment of the present invention, a segment of a holographic recording tape includes an active portion 10 having a thickness of approximately two microns. The active portion 10 is comprised of a photoconducter layer 12 intermediate to a metallic layer 14 and a thermoplastic layer 16 whereby the thermoplastic 16 has a free surface 10. Because of being only two microns thick, the active portion 10 is not self-supporting and therefore, is carried by a mylar substrate 20 which is a supporting structure.

The structure 18 is undulated whereby the thickness of the thermoplastic 16 is uneven. Preferably, thermoplastic 16 is constructed to provide the surface 18 with undulations having a spatial frequency much lower than spatial frequencies included in a diffraction grating comprising a hologram. Undulations having the much lower frequency do not diffract light and therefore, are not part of the diffraction grating.

It is well-known that spatial frequencies of the diffraction grating are on the order of 1,000 cycles per millimeter. Accordingly, the undulations should have a frequency less than 100 cycles per millimeter.

The surface 18 has locations 21, 22, 23 where the thermoplastic 16 has a 0.6 microns (0.0006 millimeters) maximum thickness, a 0.4 microns minimum thickness, and a 0.5 microns intermediate thickness, respectively. In this embodiment, the distance between the locations 21, 22 (onehalf cycle) is one-half of a millimeter whereby the spatial frequency of the undulation is one cycle per millimeter. It should be understood that on the surface 18 a hologram may be recorded as described hereinbefore or in any other suitable manner.

Figure 2:
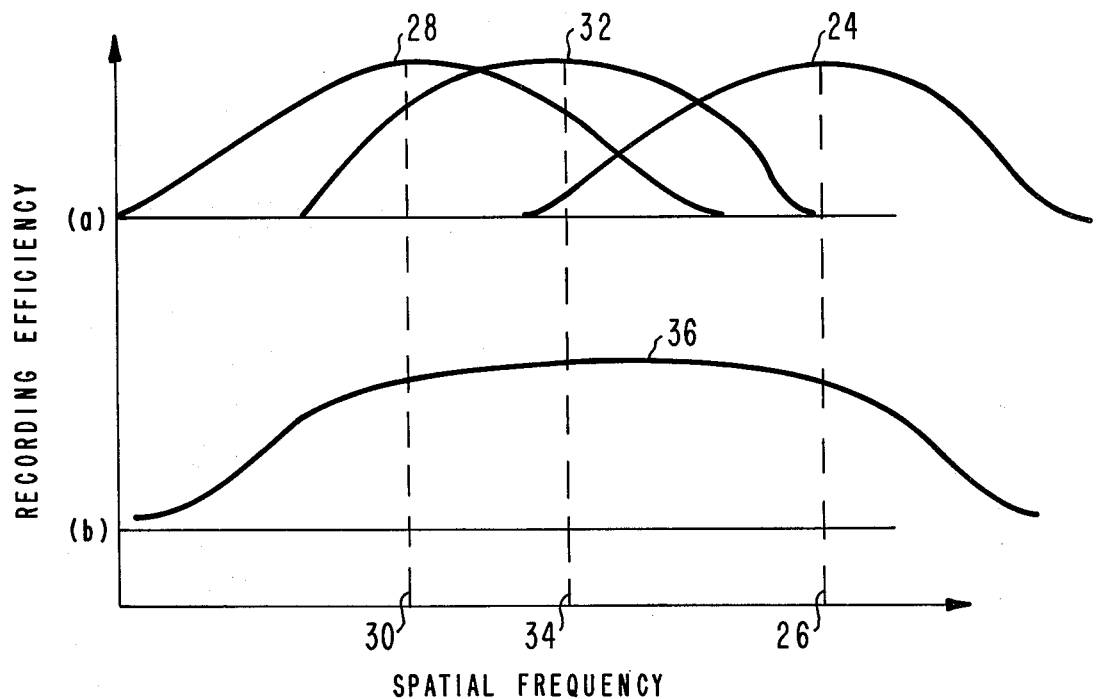
FIG. 2 is a graphic showing of the spatial frequency pass band of a thermoplastic layer of FIG. 1.

Referring to FIG. 2, illustrative (a), a spatial frequency response of the thermoplastic 16 at the location 22 is represented by a curve 24 which is centered about an abscissa 26 representative of an upper frost frequency. In this embodiment, the abscissa 26 represents a frequency of 1,250 cycles per millimeter.

Correspondingly, a spatial frequency response at the location 21 is represented by a curve 28 centered about an abscissa 30 representative of a lower frost frequency. In this embodiment, the abscissa 30 represents a frequency of 733 cycles per millimeter.

In a similar manner, a spatial frequency response at the location 23 is represented by a curve 32 centered about an abscissa 34 representative of an intermediate frost frequency. In this embodiment, the abscissa 34 represents a frequency of 1,000 cycles per millimeter.

Referring to FIG. 2, illustration (b), since the surface 18 is undulated, the thermoplastic 16 has a multiplicity of frost frequencies in a range from 733 cycles per millimeter to 1,250 cycles per millimeter. Therefore, the thermoplastic 16 has a multiplicity of pass bands which form a composite pass band represented by a curve 36.

Figure 3:
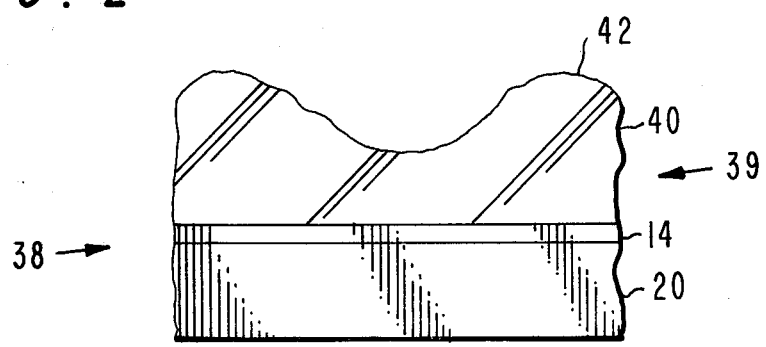
FIG. 3 is a side elevation of a segment of tape in accordance with an alternative embodiment of the present invention.

Referring to FIG. 3, in an alternative embodiment of the present invention, a segment 39 of a holographic recording tape includes an active portion 38 comprised of a photoplastic layer 40. The photoplastic 40 is a thermally deformable plastic which is photoconductive. Accordingly, the photoplastic 40 has combined properties of the thermoplastic 16 and the photoconductor 12 described hereinbefore.

The photoplastic 40 is disposed upon the metallic layer 14 whereby the active portion 38 is carried by the substrate 20. Additionally, the photoplastic 40 has an undulated surface 42 similar to the surface 18 referred to hereinbefore. Therefore, because of the surface 42, the photoplastic 40 has a multiplicity of pass bands which form a composite pass band. The hologram is recorded on the segment 39 in a manner similar to recording a hologram of an image on thermoplastic.

In other embodiments, the uneven thickness may be provided by a thermally deformable plastic layer having the shape of a wedge.

What is claimed is:

1. In a holographic recording medium wherein an electrically conductive layer has first and second surfaces respectively connected to a surface of a substrate and to one surface of a photoconductor layer that is adapted to receive an interference pattern of light representative of an image, the improvement comprising a thermoplastic layer of the type that has a frost frequency inversely related to thickness, said thermoplastic layer having a surface with undulations that cause said thermoplastic layer to have a multiplicity of frost frequencies, said undulations having a spatial frequency less than any one frost frequency of said multiplicity of frost frequencies, said thermoplastic layer being disposed upon the other surface of said photoconductor layer, whereby said thermoplastic layer has a surface abutting said photoconductor layer and a free surface.

2. The medium of claim 1 wherein said thermoplastic has frost frequencies substantially within a range from 733 cycles per millimeter to 1,250 cycles per millimeter.

3. The medium of claim 1 wherein said thermoplastic layer has maximum and minimum thicknesses substantially equal to 0.6 microns and 0.4 microns, respectively.

4. The medium of claim 1 wherein said undulation has a spatial frequency less than 100 cycles per millimeter.

5. In a holographic recording medium wherein one surface of an electrically conductive layer is connected to a surface of a substrate, the improvement comprising a photoplastic layer of the type that has a frost frequency inversely related to thickness, said photoplastic layer having a surface with undulations that cause said photoplastic layer to have a multiplicity of frost frequencies, said undulations having a spatial frequency less than any one frost frequency of said multiplicity of frost frequencies, said photoplastic layer being disposed upon the other surface of said conductive layer, whereby said photoplastic layer has a surface abutting said conductive layer and a free surface.

6. The medium of claim 5 wherein said thermoplastic has frost frequencies substantially within a range from 733 cycles per millimeter to 1,250 cycles per millimeter.

7. The medium of claim 5 wherein said photoplastic layer has maximum and minimum thicknesses substantially equal to 0.6 microns and 0.4 microns, respectively.

8. The medium of claim 5 wherein said undulation has a spatial frequency less than 100 cycles per millimeter.

* * * * *